US010808146B2

(12) United States Patent
Beschmann et al.

(10) Patent No.: US 10,808,146 B2
(45) Date of Patent: Oct. 20, 2020

(54) ADHESIVE-RESIN-MODIFIED ADHESIVE MASS

(71) Applicant: TESA SE, Norderstedt (DE)

(72) Inventors: Jennifer Beschmann, Hamburg (DE); Alexander Prenzel, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/757,826

(22) PCT Filed: Aug. 16, 2016

(86) PCT No.: PCT/EP2016/069440
§ 371 (c)(1),
(2) Date: Mar. 6, 2018

(87) PCT Pub. No.: WO2017/042003
PCT Pub. Date: Mar. 16, 2017

(65) Prior Publication Data
US 2018/0355220 A1 Dec. 13, 2018

(30) Foreign Application Priority Data
Sep. 8, 2015 (DE) .................. 10 2015 217 131

(51) Int. Cl.
*C09J 133/08* (2006.01)
*C08F 220/18* (2006.01)
*C08K 5/07* (2006.01)
*C08L 33/08* (2006.01)
*C08F 2/48* (2006.01)
*C09J 133/10* (2006.01)
*C09J 7/38* (2018.01)

(52) U.S. Cl.
CPC ............ *C09J 7/385* (2018.01); *C08F 2/48* (2013.01); *C08F 220/18* (2013.01); *C08K 5/07* (2013.01); *C08L 33/08* (2013.01); *C09J 133/08* (2013.01); *C09J 133/10* (2013.01); *C08F 2500/01* (2013.01)

(58) Field of Classification Search
CPC ........ C09J 7/385; C09J 133/08; C09J 133/10; C08F 2/48; C08F 220/18; C08K 5/07; C08L 33/08
USPC ........................................................ 524/560
See application file for complete search history.

(56) References Cited

U.S. PATENT DOCUMENTS

| | | |
|---|---|---|
| 4,144,157 A | 3/1979 | Guse et al. |
| 4,234,662 A | 11/1980 | Pastor et al. |
| 5,047,443 A | 9/1991 | Rehmer |
| 5,194,455 A | 3/1993 | Massow et al. |
| 5,264,533 A | 11/1993 | Rehmer et al. |
| 5,391,406 A | 2/1995 | Ramharack et al. |
| 5,416,127 A | 5/1995 | Chandran et al. |
| 7,238,732 B2 | 7/2007 | Bamborough et al. |
| 7,964,249 B2 * | 6/2011 | Cartellieri ............... C08F 8/00 427/516 |
| 2003/0008140 A1 | 1/2003 | Takizawa et al. |
| 2005/0182150 A1 * | 8/2005 | Bamborough ............ C09J 4/00 522/109 |

FOREIGN PATENT DOCUMENTS

| | | |
|---|---|---|
| DE | 2443414 C2 | 3/1976 |
| DE | 2743979 B2 | 4/1979 |
| DE | 102004003764 A1 | 8/2005 |
| EP | 0343467 A2 | 11/1979 |
| EP | 0578151 B1 | 1/1994 |
| JP | 2004-510866 A | 4/2004 |
| JP | 2007-523979 A | 8/2007 |
| WO | 9635725 A1 | 11/1996 |
| WO | 0228963 A2 | 4/2002 |

OTHER PUBLICATIONS

International Search Report for corresponding application PCT/EP2016/069440 dated Sep. 15, 2016.
written Opinion of the International Searching Authority for corresponding application PCT/EP2016/069440 dated Sep. 15, 2016 (English translation not available).

* cited by examiner

*Primary Examiner* — Kelechi C Egwim
(74) *Attorney, Agent, or Firm* — Norris McLaughlin, P.A.

(57) ABSTRACT

The invention relates to a UV-cross-linked, polyacrylate-based adhesive mass that has high adhesive force and high cohesion and that can be produced by means of a hot-melt process with subsequent cross-linking. This is achieved by providing an adhesive mass that can be obtained by cross-linking a composition, which comprises at least one poly(meth)acrylate having a weight-average molar mass $M_w$ of at least 100,000 g/mol and at least one polyfunctional α-cleaver and is characterized in that the composition contains at least one adhesive-force-increasing resin having a weight average molar mass $M_w$ of at most 30,000 g/mol, which resin can be obtained by polymerizing a monomer composition M1, comprising at least one compound according to formula (I) $H_2C=C(R^1)(COOR^2)$, wherein $R^1$ represents a hydrogen atom or a methyl group and $R^2$ represents a hydrogen atom or a functionalized or non-functionalized $C_1$-$C_{20}$ alkyl group.

8 Claims, No Drawings

ADHESIVE-RESIN-MODIFIED ADHESIVE MASS

This application is a § 371 U.S. National stage of PCT International Patent Application No. PCT/EP2016/069440, filed Aug. 16, 2016, which claims foreign priority benefit of German Application No. DE 10 2015 217 131.0, filed Sep. 8, 2015, the disclosures of each of which patent applications are incorporated herein by reference.

The invention relates to the technical field of pressure sensitive adhesives (PSAs), more particularly of radiation-crosslinked PSAs. Presented more specifically are a resin-modified, radiation-crosslinked pressure sensitive adhesive and also a method for producing it via a hotmelt process with subsequent radiation crosslinking, and the use of this adhesive.

PSAs crosslinked by radiation, especially UV radiation, have already been known for some considerable time. They offer a variety of advantages over the conventional systems that are crosslinkable thermally. For instance, UV-crosslinkable acrylate polymers, applied two-dimensionally to a carrier from the solution, for example, can be crosslinked targetedly to the desired extent by varying the activator concentration and the UV dose. Control over the crosslinking density and hence over numerous properties of the product is therefore readily possible not only through the dosing of crosslinker but also through the operating parameters—in this case, the UV dose. Polymer systems which can be dynamically controlled in this way signify a substantial advantage in a modern production structure, when a complex product portfolio is to be realized starting from a few basic building blocks.

UV crosslinking can be achieved by different methods. In the simplest case, a UV activator is added to a customary, saturated polyacrylate. A distinction is made here between Norrish type I and type II activators: the former cleave after the UV activation, while the latter abstract hydrogen atoms after the UV activation.

It has emerged that admixed type I photoinitiators are generally incapable of generating crosslinkable radicals on a customary saturated polyacrylate. Other, competing reactions are predominant. If a type II photoinitiator is added, in contrast, a crosslinking reaction can be achieved in a polyacrylate composition which has not undergone further modification—for example, in a copolymer of 2-ethylhexyl acrylate and acrylic acid. This reaction, however, is not very efficient if resins are admixed in order to increase the peel adhesion. A particular reason for this is that the resins absorb UV light, have a strongly regulating influence, and thus adversely affect or even prevent UV crosslinking. Even the addition of polyfunctional acrylates or methacrylates in order to increase the crosslinking efficiency has only little effect. Moreover, unreacted acrylate groups can lead to disruptive post-crosslinking, which is a disadvantage for the stability of the product properties.

A more elegant method lies in incorporating vinylic double bonds into the acrylate polymer from the outset, in order to facilitate crosslinking.

U.S. Pat. No. 4,234,662 describes a method for producing hotmelt adhesives having pressure-sensitive properties, which consists of the following steps:

copolymerization of allyl acrylates or methacrylates with at least one copolymerizable acrylate monomer, to give a prepolymer which is solid at room temperature; heating of the resultant solid, allylically unsaturated prepolymer to a temperature at which it is liquid and flowable; and coating of the liquid prepolymer onto a substrate. The coated substrate is exposed to electron beams of 1 to 4 megarad, which is capable of crosslinking the prepolymer, giving a cured, pressure-sensitive adhesive. A disadvantage of this method is the difficulty of implementing it, since the polymers tend to form gels during the radically initiated polymerization and during coating from the melt.

U.S. Pat. Nos. 5,391,406 and 5,416,127 therefore propose targetedly incorporating the polymer-bonded vinyl groups by means of a polymer-analogous reaction with meta-isopropenyl-$\alpha,\alpha$-dimethylbenzyl isocyanate (m-TMI). Polymers functionalized in this way can be coated from the melt without gelling, since the ceiling temperature of the thermal polymerization of the isopropenyl group is below the coating temperature. If a photoinitiator is added to the polymer, the composition is UV-crosslinkable. Even this method, nevertheless, has disadvantages in practice: firstly, the operation conducted, via the polymer-analogous reaction, is very involved and therefore complicated, and, secondly, high molecular mass polymers functionalized with double bonds, of the kind formed in this case, are particularly susceptible to shearing at high temperatures and therefore lead to severe unwanted gelling during processing in the hotmelt operation, where high shearing forces are active because of the extruder processing.

Copolymerizable photoinitiators likewise facilitate crosslinking. For instance, DE 24 43 414 A1 describes a method for producing products furnished self-adhesively with an adhesive based on crosslinked polyacrylic acid derivatives, where the adhesive comprises 0.01% to 5% of a copolymerized (2-alkoxy-2-phenyl-2-benzoyl)ethyl acrylate or methacrylate as photoinitiator and is crosslinked by brief irradiation with ultraviolet light. The (meth)acrylic esters used as photosensitizers there, however, are accessible only through a multistage synthesis with a relatively poor yield, and, furthermore, are not very efficient at UV crosslinking.

Described in DE 27 43 979 A1 is a method for producing products coated with a self-adhesive composition based on crosslinked polyacrylic acid derivatives, the method involving the copolymerization of a photoinitiator into the adhesive and subsequent crosslinking on the carrier material by means of brief UV irradiation, wherein the photoinitiator copolymerized into the PSA is 0.01 to 5 wt % of benzoin acrylate or methacrylate.

The adhesives described in these patents are prepared preferably by polymerization in solution and then are coated from the solution onto a carrier. Only the dried coat can then be subjected to UV irradiation. Generally, however, the copolymerized photoinitiators have a substantial disadvantage: the preparation of a UV-crosslinking acrylate PSA system is very limited, since there are only very few photoinitiators available without substantial complexity and therefore of economic interest as copolymerizable compounds.

EP 0 578 151 B1 describes the use of polyacrylate-based PSAs with copolymerized benzoin derivatives for the large-scale industrial, continuous coating of medical products from the melt, with subsequent crosslinking of the adhesive by UV irradiation. This as well is subject to the restrictions referred to above on the availability of economically interesting photoinitiators.

EP 0 343 467 A2, U.S. Pat. Nos. 5,047,443 and 5,264,533 describe copolymerizable benzophenone derivatives which after UV irradiation are able to abstract hydrogen atoms. In contrast to the splittable activators, these photoactivators form no constituents of low molecular mass, which may outgas from the cured adhesive coat and adversely affect its properties. For instance, after the UV irradiation of the systems described in references including DE 27 43 979 A1, benzaldehyde is formed, which can be perceived as a nuisance odor.

All photoinitiators described up to now, and the UV-crosslinkable acrylate prepolymers prepared from them, have a significant restriction in terms of the wavelength range which possesses a triggering effect for the crosslinking reaction. Each photoinitiator incorporated into the system through copolymerization mandates the wavelength range subsequently available for crosslinking, by virtue of its absorption maximum.

This results in a restriction if the acrylate prepolymer in question is to be crosslinked by ultraviolet radiation, for example, in a relatively thick coat, as a resin-blended polymer composition, or provided with pigments. Accordingly, the great number of the conventional systems can be crosslinked adequately only up to a limited coat thickness (for example, the system from the aforementioned DE 27 43 979 A1 up to a coat thickness of 50 μm). For thicker coats, the polymer no longer has sufficient transparency to UV light in a wavelength range in which the photoinitiator is active. Pigmented coats, comprising polymer compositions colored white with titanium dioxide, for example, can no longer be UV-crosslinked at all in a wavelength range of 250 nm (absorption maximum of the abovementioned benzoin acrylates).

U.S. Pat. No. 5,194,455 describes a method for producing pressure-sensitive acrylate-based hotmelt adhesives by irradiation of a substrate, where at least one acrylic monomer is copolymerized with N-tert-butylacrylamide (NTBAM). The reaction mixture for polymerization may further comprise one or more ethylenically unsaturated compounds which are not part of the group of the aforementioned acrylic monomers. The resulting solid polymer is heated and, in a fluid or liquid state, is applied to a substrate, with additives and auxiliaries possibly being included, and the coated substrate is irradiated with high-energy radiation.

WO 96/35725 A1 claims a crosslinked, pigmented, pressure-sensitive adhesive bonding agent which comprises a copolymer that is coated onto a substrate and is cured by UV radiation so as to possess a shear strength of at least 20 hours at 70° C. The adhesive bonding agent comprises a pigment, a hydrogen-abstracting photoinitiator, and an acrylate-based copolymer, the copolymer being prepared from a substantially acid-free monomer mixture whose composition is as follows:

(i) 30 to 99.99 wt % of at least one alkyl acrylate, the alkyl group possessing 1 to 24 carbon atoms,
(ii) 0.01 to 15 wt % of a monomer including a tertiary amino group,
(iii) 0 to 25 wt % of at least one polar vinyl monomer, and
(iv) 0 to 30 wt % of a diester of an ethylenically unsaturated dicarboxylic acid, based in each case on the total weight of the monomers.

For the crosslinking of coats of these polyacrylates, long-wave UV activators such as isopropylthioxanthone are required. A disadvantage of copolymerized dimethylaminoalkyl compounds is the limitation to comonomers free from carboxylic acid, as took place in all embodiments of WO 96/35725 A2. For example, the thermally initiated solution polymerization of acrylate monomers, acrylic acid, and olefinically unsaturated dimethylaminoalkyl compounds leads after a short reaction time to a sharp increase in viscosity and to gelling.

Polar acrylate polymers in particular, and those containing carboxylic acid, especially, are particularly advantageous for high-performance adhesives. Internal strength, influenced significantly by intermolecular hydrogen bonds, may be supported most efficiently, in addition to the actual crosslinking, by copolymerizable acrylic acid. The peel increase behavior known for polyacrylates, which produces a boosting of the bond strength, is also improved substantially in the presence of significant fractions of copolymerized acrylic acid.

For saturated systems especially, the usual initiators are unsuitable or are suitable only when the system to be crosslinked is activated by means of comonomers or adjacent electron donor groups. To date, therefore, only a few UV-crosslinking systems have been described that are capable of efficiently crosslinking polyacrylates without functional comonomers.

A further disadvantage is that many of the initiators in general use do not withstand the hotmelt process—that is, when heated to temperatures of the kind customary in such processes, they lose their reactivity as crosslinking initiators.

For instance, benzoin methyl ether and benzil dimethyl ketal are cited as frequently employed type I photoinitiators. Both photoinitiators cannot be used, or can be used only with severe limitations, for the hotmelt process, since over a longer period they are unstable and break down. This is the case especially in systems containing acrylic acid, which generally form the basis in the case of polyacrylate PSAs.

Benzophenone as a hydrogen-abstracting initiator (type II) does have a higher thermal stability, but sublimes to a high degree from the acrylate PSA under thermal load and under reduced pressure. The behavior of camphorquinone is similar, it likewise having only a relatively low molecular weight and therefore tending, under reduced pressure and at elevated temperatures, to escape from the composition that is to be crosslinked.

It was possible to resolve many of the aforementioned disadvantages through the use of a polyfunctional α-splitter, as described in WO 02/28963 A2; nevertheless, the adhesives mostly do not have a favorable balance between adhesion and cohesion. The peel adhesion at least can be improved through the use of tackifying resins, but that frequently results in a lowering of the cohesion.

DE 10 2004 003 764 A1 describes the use of condensation resins, synthesized from urea or derivatives of urea and from ketones or aldehydes, as tackifying resins in UV-crosslinkable acrylate hotmelt adhesives. The use of these resins, though, produces only minimal improvements in terms of adhesion and cohesion relative to resin-free compositions. Moreover, as already described above, the polymer-bound benzophenone functionalities give rise to restrictions, if the acrylate prepolymers are to be present, for example, in a relatively thick coat, as a resin-blended polymer composition, or provided with pigments.

US 2005/182150 A1 likewise describes UV-crosslinkable acrylate PSAs with polymer-bound type II photoinitiators that comprise a tackifying resin composed of at least one aromatic monomer and at least one acrylate. It was in fact possible to show that good properties could be achieved in spite of the UV-absorbing tackifying resins, but here as well there are the above-stated restrictions because of the type of photoinitiator incorporated in the polymer.

It is an object of the invention to provide a UV-crosslinked, polyacrylate-based pressure sensitive adhesive featuring high peel adhesion and high cohesion. The formulations are to be able to be produced via a hotmelt process and subsequently crosslinked. At the same time they are to be stable over a prolonged period with respect to the drastic conditions attending the hotmelt process, i.e., they are to have an appropriately long pot life. Gelling of the polyacrylate system during the hotmelt process is to be avoided, at least to a large extent. As far as possible, there should be no need for the presence of additional components or groups that activate the crosslinking.

For the definition of a melt of an amorphous polymer such as a polyacrylate, for example, the criteria used below are those defined in F. R. Schwarzl, *Polymermechanik: Struktur und mechanisches Verhalten von Polymeren*, Springer Verlag, Berlin, 1990 on pages 89 to 91, according to which the viscosity has the order of magnitude of approximately $\eta \approx 10^4$ Pa·s and the internal damping reaches tan δ values of ≥1.

The achievement of the above object is based on the concept of using specific UV initiators and acrylate-based tackifying resins. A first, general subject of the invention is a pressure sensitive adhesive which is obtainable by crosslinking a composition which comprises at least one poly(meth)acrylate having a weight-average molar mass $M_w$ of at least 100 000 g/mol and at least one polyfunctional α-splitter and which is characterized in that the composition comprises at least one adhesion-boosting resin having a weight-average molar mass $M_w$ of at most 30 000 g/mol, preferably of at most 10 000 g/mol, which is obtainable by polymerizing a monomer composition M1, comprising at least one compound according to the formula (I)

$$H_2C\!=\!C(R^1)(COOR^2) \quad (I),$$

in which $R^1$ is a hydrogen atom or a methyl group and $R^2$ is a hydrogen atom or a functionalized or unfunctionalized $C_1$-$C_{20}$ alkyl group.

It has emerged that the UV crosslinking which leads to PSAs of the invention is affected hardly at all by the acrylate resins, whereas peel adhesion and cohesion of the adhesives are increased significantly. The adhesives can be processed stably in a hotmelt process.

A pressure sensitive adhesive is understood in accordance with the invention, as is customary within the general usage, as a material which—in particular at room temperature—is permanently tacky and also adhesive. Characteristics of a pressure sensitive adhesive are that it can be applied by pressure to a substrate and remains adhering there, with no further definition of the pressure to be applied or the period of exposure to this pressure. In certain cases, depending on the precise nature of the pressure sensitive adhesive, the temperature, and the atmospheric humidity and also the substrate, a minimal pressure of short duration, which does not go beyond gentle contact for a brief moment, is enough to achieve the adhesion effect, while in other cases a longer-term period of exposure to a high pressure may be necessary.

Pressure sensitive adhesives have particular, characteristic viscoelastic properties which result in the permanent tack and adhesiveness. A characteristic of these adhesives is that when they are mechanically deformed, there are processes of viscous flow and there is also development of elastic forces of recovery. The two processes have a certain relationship to one another in terms of their respective proportion, in dependence not only on the precise composition, the structure, and the degree of crosslinking of the pressure sensitive adhesive, but also on the rate and duration of the deformation, and on the temperature.

The proportional viscous flow is necessary for the achievement of adhesion. Only the viscous components, brought about by macromolecules with relatively high mobility, permit effective wetting and effective flow onto the substrate where bonding is to take place. A high viscous flow component results in high tack (also referred to as surface stickiness) and hence often also in a high peel adhesion. Highly crosslinked systems, crystalline polymers, or polymers with glasslike solidification lack flowable components and are therefore in general devoid of tack or possess only little tack at least.

The proportional elastic forces of recovery are necessary for the attainment of cohesion. They are brought about, for example, by very long-chain macromolecules with a high degree of coiling, and also by physically or chemically crosslinked macromolecules, and they allow the transmission of the forces that act on an adhesive bond. As a result of these forces of recovery, an adhesive bond is able to withstand a long-term load acting on it, in the form of a long-term shearing load, for example, sufficiently over a relatively long time period.

For the more precise description and quantification of the extent of elastic and viscous components, and also of the relationship between the components, it is possible to employ the variables of storage modulus (G') and loss modulus (G"), which can be determined by means of Dynamic Mechanical Analysis (DMA). G' is a measure of the elastic component, G" a measure of the viscous component, of a substance. Both variables are dependent on the deformation frequency and the temperature.

The variables can be determined with the aid of a rheometer. In that case, for example, the material under investigation is exposed in a plate/plate arrangement to a sinusoidally oscillating shear stress. In the case of instruments operating with shear stress control, the deformation is measured as a function of time, and the time offset of this deformation is measured relative to the introduction of the shear stress. This time offset is referred to as phase angle θ.

The storage modulus G' is defined as follows: G'= (τ/γ)·cos(δ) (τ=shear stress, γ=deformation, δ=phase angle=phase shift between shear stress vector and deformation vector). The definition of the loss modulus G" is as follows: G"=(τ/γ)·sin(δ) (τ=shear stress, γ=deformation, δ=phase angle=phase shift between shear stress vector and deformation vector).

A substance is considered in general to be a pressure sensitive adhesive, and is defined as being pressure-sensitively adhesive for the purposes of the invention, if at room temperature, presently by definition at 23° C., in the deformation frequency range from 100 to 101 rad/sec, G' is located at least partly in the range from 103 to 107 Pa and if G" likewise is located at least partly within this range. "Partly" means that at least one section of the G' curve lies within the window described by the deformation frequency range from 100 inclusive up to 101 inclusive rad/sec (abscissa) and by the G' value range from 103 inclusive up to 107 inclusive Pa (ordinate). For G" this applies correspondingly.

A "poly(meth)acrylate" means a polymer whose monomer basis consists to an extent of at least 50 wt % of acrylic acid, methacrylic acid, acrylic esters and/or methacrylic esters, with acrylic esters and/or methacrylic esters being included at not less than 35 wt %, based in each case on the total monomer composition of the polymer in question. Poly(meth)acrylates are accessible generally through radical polymerization of acrylic and/or methylacrylic monomers and also, optionally, further copolymerizable monomers. In accordance with the invention the term "poly(meth)acrylate" embraces not only polymers based on acrylic acid and derivatives thereof but also those based on acrylic acid and methacrylic acid and derivatives thereof, and those based on methacrylic acid and derivatives thereof.

The term "poly(meth)acrylate" or "poly(meth)acrylates" identifies hereinafter the poly(meth)acrylate or the poly(meth)acrylates, respectively, having a weight-average molar mass Mw of at least 100 000 g/mol. The weight-average molar mass Mw is determined in accordance with the invention by means of gel permeation chromatography (Measurement method A2, see Examples).

The poly(meth)acrylate or poly(meth)acrylates of the PSA of the invention or of the composition to be crosslinked to give the PSA of the invention (and also referred to hereinafter simply as "composition of the invention") is or are preferably synthesized from a monomer composition M2 which consists of (i) 65 to 100 wt % of one or more acrylic esters and/or methacrylic esters of the formula (II)

$$H_2C=C(R^1)(COOR^2) \quad (I),$$

in which $R^1$ is a hydrogen atom or a methyl group and $R^3$ is an unsubstituted $C_1$-$C_{22}$ alkyl chain;
(ii) 0 to 20 wt % of acrylic acid and/or methacrylic acid;
(iii) 0 to 35 wt % of one/of one or more acrylic esters and/or methacrylic esters not conforming to the formula (II), and/or of other vinyl compounds having functional groups,
based in each case on the total weight of the monomer composition M2.

The poly(meth)acrylate is prepared preferably by a free or controlled radical polymerization. The polymerization may be carried out in polymerization reactors which in general are provided with a stirrer, a plurality of feed vessels, reflux condenser, heating, and cooling, and are equipped for operation under $N_2$ atmosphere and superatmospheric pressure.

The radical polymerization is conducted in the presence of one or more organic solvents and/or in the presence of water, or in bulk. The aim here is to minimize the amount of solvent used. Depending on conversion and temperature, the polymerization time is generally between 6 and 48 hours. The weight-average molecular weight $M_w$ of the polymers, determined by gel permeation chromatography (Measurement method A2), is preferably between 300 000 and 2 000 000 g/mol, preferably between 600 000 and 1 200 000 g/mol. Solvents used for the solution polymerization are preferably esters of saturated carboxylic acids (e.g., ethyl acetate), aliphatic hydrocarbons (e.g., n-hexane or n-heptane), ketones (e.g., acetone or methyl ethyl ketone), special-boiling-point spirit, or mixtures of these solvents. Very preferred is the use of a solvent mixture of acetone and isopropanol with an isopropanol content of between 1 and 10 percent by weight. Polymerization initiators commonly used are customary radical-forming compounds, such as peroxides and azo compounds, for example. Initiator mixtures can also be used. During the polymerization, it is also possible to use thiols as further regulators for lowering molecular weight and reducing the polydispersity. Other polymerization regulators—referred to as chain transfer agents—which can be used include alcohols and ethers, for example.

The monomers (i) are preferably selected from the group consisting of methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate and the branched isomers thereof, especially 2-ethylhexyl acrylate; cyclohexyl methacrylate, isobornyl acrylate, and isobornyl methacrylate.

The monomers (iii) are preferably selected from the group consisting of maleic anhydride, itaconic anhydride, glycidyl methacrylate, hydroxyethyl acrylate, 4-hydroxybutyl acrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, tetrahydrofurfuryl acrylate, styrene, 4-vinylpyridine, N-vinylpyrrolidone, N-vinylphthalimide, methylstyrene, and 3,4-dimethoxy-styrene.

The comonomers (i) to (iii) of the at least one poly(meth)acrylate of the composition of the invention are preferably selected such that the glass transition temperature $T_{g,A}$ of the polymer is below the application temperature, preferably at $T_{g,A} \leq 15°$ C. Additionally, the proportions in the monomer composition are preferably selected such as to result in the desired $T_{g,A}$ value for the polymer in accordance with the Fox equation (E1) (cf. T. G. Fox, *Bull. Am. Phys. Soc.* 1956, 1, 123).

$$\frac{1}{T_g} = \sum_n \frac{w_n}{T_{g,n}} \quad (E1)$$

In this equation, n represents the serial number of the monomers used, $W_n$ the mass fraction of the respective monomer n (wt %), and $T_{g,n}$ the respective glass transition temperature of the homopolymer of the respective monomers n, in K.

The composition of the invention may comprise one or more poly(meth)acrylates having a weight-average molar mass $M_w$ of at least 100 000 g/mol. Poly(meth)acrylates having a weight-average molar mass $M_w$ of at least 100 000 g/mol are present preferably in the composition of the invention at a total of 50 to 90 wt %, more preferably a total of 60 to 80 wt %, based in each case on the total weight of the composition.

The composition of the invention or pressure sensitive adhesive may comprise further polymers present in the form of a blend with the poly(meth)acrylate(s), examples being natural rubber, synthetic rubbers, EVA, silicone rubbers, acrylic rubbers and/or polyvinyl ethers.

The composition of the invention comprises at least one polyfunctional α-splitter. In accordance with the invention, compounds identified as α-splitters are compounds with initiator function which split intramolecularly during the initiation step of the crosslinking, through ultraviolet irradiation, for example, and in so doing break down into radical fragments. In this process, the bond to the heteroatom or carbon atom located in α-position to a group which activates radical formation, more particularly to a carbonyl group, is cleaved. "Polyfunctional" means that the α-splitter has at least two groups which activate radical formation.

The polyfunctional α-splitter is preferably a poly-α-hydroxyketone.

With particular preference the polyfunctional α-splitter is oligo[2-hydroxy-2-methyl-1-[4-(1-methylvinyl)phenyl]propanone] (III), sold commercially, for example, under the name Esacure® KIP 150 by Lamberti.

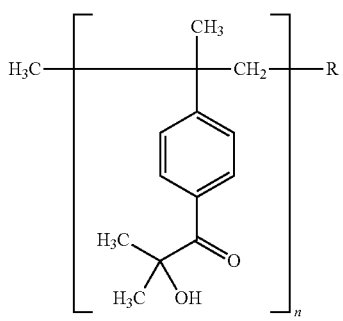

(III)

Oligo[2-hydroxy-2-methyl-1-[4-(1-methylvinyl)phenyl] propanone can in accordance with the invention also be present as a constituent of a mixture with further UV-active substances, of the kind sold, for example, as Esacure® KT55 by Lamberti.

Likewise with particular preference, the polyfunctional α-splitter is an α-hydroxyketone of the structure (IV)

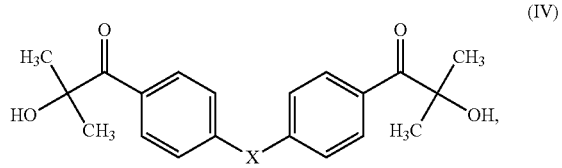

(IV)

in which X is an oxygen atom or a $CH_2$ group. More particularly the α-hydroxyketone of the structure (IV) is 2-hydroxy-1-[4-[4-(2-hydroxy-2-methylpropanoyl)phenoxy]phenyl]-2-methylpropan-1-one, sold commercially, for example, under the name Esacure® KIP 160 by Lamberti.

The composition of the invention preferably comprises 0.1 to 5 wt %, more particularly 0.25 to 1 wt %, based in each case on the polymer to be crosslinked, of polyfunctional α-splitters. There may be one or more polyfunctional α-splitters present.

Preferably, in the synthesis of the polymer to be crosslinked, the α-splitter which serves as photoinitiator is not incorporated by polymerization, but is instead admixed as a separate component after the polymerization, but before the crosslinking. In on-line operation, this is synonymous with an addition made prior to the hotmelt process, since the crosslinking immediately follows this process.

It has emerged that the UV initiators used in accordance with the invention withstand the conditions of the hotmelt process over a relatively long time: accordingly, for over an hour and longer, it was not possible to ascertain any decomposition or other destruction, and nor did these initiators undergo volatilization, as is observed for the UV initiators customarily used in the hotmelt process, generally no later than during the concentrating procedure.

In order to increase the lifetime of the PSAs and their precursor products, it is advisable to store them and/or process them in the dark.

The composition of the invention further comprises at least one adhesion-boosting resin having a weight-average molar mass $M_w$ of not more than 30 000 g/mol, preferably of not more than 10 000 g/mol, which is obtainable by polymerization of a monomer composition M1, comprising at least one compound according to the formula (I)

$$H_2C=C(R^1)(COOR^2) \qquad (I),$$

in which $R^1$ is a hydrogen atom or a methyl group and $R^2$ is a hydrogen atom or a functionalized or unfunctionalized $C_1$-$C_{20}$ alkyl group. The monomer composition M1 preferably comprises one or more compounds according to the formula (I) at a total of at least 50 wt %, based on the total weight of the monomer composition M1. With particular preference the monomer composition M1 comprises exclusively one or more compounds according to the formula (I).

$R^2$ in the formula (I) may be a functionalized $C_1$-$C_{20}$ alkyl group. Preferably $R^2$ is not an amino-functionalized alkyl group, since functions of that kind may intervene in the photocrosslinking reaction and, moreover, may enter into acid-base reactions with acid-functionalized poly(meth) acrylates, and that can lead to unwanted stiffening of the matrix.

In particular, $R^2$ may be a carboxylic acid-functionalized and/or hydroxy-functionalized alkyl group. With particular preference, however, $R^2$ in the formula (I) is an unfunctionalized $C_1$-$C_{20}$ alkyl group. In particular, $R^2$ is an unfunctionalized $C_1$-$C_{20}$ alkyl group in all compounds according to the formula (I) that are encompassed by the monomer composition M1.

Preferably, furthermore, the comonomer composition of the resin (M1) and that of the poly(meth)acrylate (M2) are selected such that the glass transition temperature of the resin is higher at least by 10 K, more preferably by at least 20 K, than that of the poly(meth)acrylate. More particularly, the glass transition temperature of the resin is higher by at least 30 up to at most 100 K than that of the poly(meth) acrylate. Very preferably, the glass transition temperature of all adhesion-boosting resins of the composition of the invention is higher by at least 10 K, more particularly by at least 20 K, very particularly by at least 30 up to at most 100 K than that of each poly(meth)acrylate present in the composition of the invention and having a weight-average molar mass $M_w$ of at least 100 000 g/mol.

The adhesion-boosting resin preferably has a ring & ball softening point (ASTM E28-99) of liquid at room temperature to 180° C., preferably of 50° C. to 150° C., more preferably of 75° C. to 120° C. The acid number of the resin, measured according to DIN EN ISO 2114, is preferably from 0 to 300 mg KOH/g resin, more preferably from 0 to 200 mg KOH/g resin, very preferably from 5 to 150 mg KOH/g resin. The hydroxyl number, determined according to DIN 53240-1, is preferably from 0 to 300, more preferably from 0 to 200.

The adhesion-boosting resin or the adhesion-boosting resins of the composition of the invention preferably has or have a MMAP cloud point (mixed methylcyclohexane-aniline point) of less than 50° C. More preferably the MMAP cloud point is between −20° C. and 30° C., more preferably between −10° C. and 20° C.

The number-average molecular weight $M_n$ (determined by GPC, Measurement method A2) of the adhesion-boosting resins is preferably 1000 to 7000 g/mol, more preferably 1500 to 4500 g/mol, very preferably 1600 to 4000 g/mol; the weight-average molecular weight $M_w$ (likewise determined by GPC) is preferably 2000 to 30 000 g/mol, more preferably 2500 to 12 000 g/mol, very preferably 3000 to 10 000 g/mol.

For numerous applications it is an advantage if the tackifying resin has little or no discoloration, a factor which may also additionally influence the crosslinking. Preferably, therefore, the resin has a Gardner color number (ASTM D1544) of less than 5, more preferably of less than 2, very preferably of less than 1.

Examples of commercially available adhesion-boosting resins in accordance with the invention include the MB 2500 series from Dianal America Inc., and Paraloid™ DM-55 from Dow.

Surprisingly it has emerged that the adhesion-boosting resins used in accordance with the invention, in addition to their adhesion-boosting effect, did not bring about any adverse influencing of the UV crosslinking. This is surprising at least insofar as the expectation would have been that, in view of the chemical similarity of the poly(meth)acrylates and the tackifying resins, the crosslinking obtained would be very unselective and therefore there would be low cohesion for a given UV dose. However, very satisfactory results were achieved for the crosslinking and the cohesion of the adhesives, hence allowing the potential of the resins employed to be utilized largely without restriction for improving the adhesion capacity of the PSAs of the invention.

The composition of the invention may comprise one or more adhesion-boosting resins. Adhesion-boosting resins of the invention, obtainable by polymerization of a monomer composition M1 comprising at least one compound according to the formula (I), are preferably present in the composition of the invention at 10 to 50 wt %, more preferably at 15 to 45 wt %, very preferably at 20 to 40 wt %, based in each case on the total weight of the composition of the invention.

Besides the above-described adhesion-boosting resins that are present necessarily in accordance with the invention, the composition of the invention may comprise further tackifying resins. For this purpose it is possible without exception to use all tackifying resins already known and described in the literature. Representative examples include the pinene resins, indene resins, and rosins, their disproportionated, hydrogenated, polymerized, esterified derivatives and salts; the aliphatic and aromatic hydrocarbon resins, examples being $C_5$ or $C_9$ hydrocarbon resins, terpene resins and terpene-phenolic resins; and also condensation resins, synthesized from urea or derivatives of urea and from ketones or aldehydes. Any desired combinations of these and further resins may be used in order to set the properties of the resultant adhesive in accordance with requirements. Express reference may be made to the depiction of the state of knowledge in the *"Handbook of Pressure Sensitive Adhesive Technology"* by Donatas Satas (van Nostrand, 1989).

The composition of the invention preferably comprises adhesion-boosting resins at a total—that is, relating to the entirety of adhesion-boosting resins present necessarily in accordance with the invention, and any further tackifying resins used—of at most 50 wt %, based on the total weight of the composition of the invention.

The composition of the invention preferably comprises aminoacrylates, more particularly oligomeric aminoacrylates. The rate of crosslinking can be increased by such aminoacrylates. Products which have emerged as being particularly suitable are those offered under the tradename Genomer™, such as Genomer 5275™, for example, from Rahn. If adding the aminoacrylates, it should be borne in mind that the increase in the crosslinking rate is accompanied by a drop in the stability under hotmelt conditions. These compounds are therefore preferably not added until shortly prior to crosslinking.

In order to boost the crosslinking efficiency, the uncrosslinked polymers of the composition of the invention are optionally blended with crosslinkers. Examples of suitable crosslinker substances are acrylates having a functionality of two or more. However, it is also possible to use all other compounds which have a functionality of two or more, are familiar to the skilled person, and are capable of crosslinking polyacrylates.

The composition of the invention or the pressure sensitive adhesive of the invention may also, furthermore, comprise fillers in powder and/or granule form, dyes and/or pigments, including in particular abrasive and reinforcing fillers such as aerosils (fumed silicas) for example.

Furthermore, the composition or pressure sensitive adhesive of the invention may comprise plasticizers, more particularly in concentrations of up to 5 wt %, based on the total weight of the composition or pressure sensitive adhesive. Plasticizers which can be used include, for example, phthalates, water-soluble plasticizers, plasticizing resins, phosphates, polyphosphates, adipates and/or citrates.

The UV crosslinking of the composition of the invention is effected preferably by means of brief ultraviolet irradiation in a wavelength range from 200 to 400 nm, more particularly using high-pressure or medium-pressure mercury lamps at an output of 80 to 200 W/cm.

Additionally to the UV crosslinking, the internal strength (cohesion) of the PSAs of the invention may optionally be enhanced by thermal crosslinking. For this purpose, the polyacrylate-containing composition of the invention may be admixed with compatible crosslinker substances, examples being metal chelates, polyfunctional isocyanates, polyfunctional amines, polyfunctional epoxides, polyfunctional aziridines, polyfunctional oxazolines or polyfunctional carbodiimides, which are able to react with reactive functionalities present in the polymer.

The uncrosslinked polymers, blended with the obligatory components and, optionally, optional components, preferably in the form of a hotmelt composition, are applied directly or transfer-laminated onto a carrier (PP, BOPP, PET, nonwoven, PVC, polyester, polyolefin foam, polyacrylate foam or polyurethane foam, etc.) or onto a release paper (glassine, HDPE, LDPE). UV crosslinking then preferably takes place directly on this carrier. Where aminoacrylates are added as described above, this is preferably done immediately prior to coating, in order to reduce to a minimum the time for which the compounds are exposed to the comparatively drastic conditions.

The invention is elucidated in more detail below with examples.

EXPERIMENTAL SECTION

Measurement Methods (General):
K Value (According to Fikentscher) (Measurement Method A1);

The K value is a measure of the average molecular size of high-polymer compounds. For the measurement, one percent strength (1 g/100 ml) toluenic polymer solutions were prepared and their kinematic viscosities were determined using a Vogel-Ossag viscometer. After standardization to the viscosity of the toluene, the relative viscosity is obtained, and can be used to compute the K value according to Fikentscher (*Polymer* 1967, 8, 381 ff.).

Gel Permeation Chromatography GPC (Measurement Method A2);

The figures for the number-average molecular weight $M_n$, the weight-average molecular weight $M_w$, and the polydispersity PD in this specification are based on the determination by gel permeation chromatography. The determination is made on 100 µL of a sample having undergone clarifying filtration (sample concentration 4 g/L). The eluent used is tetrahydrofuran with 0.1 vol % of trifluoroacetic acid. Measurement takes place at 25° C. The precolumn used is a column type PSS-SDV, 5μ, $10^3$ Å, ID 8.0 mm×50 mm. Separation takes place using the columns of type PSS-SDV, 5μ, $10^3$ Å and also $10^5$ Å and $10^6$ Å each with an ID of 8.0 mm×300 mm (columns from Polymer Standards Service; detection using Shodex R171 differential refractometer). The flow rate is 1.0 ml per minute. Calibration takes place against PMMA standards (polymethyl methacrylate calibration).

Static Glass Transition Temperature $T_g$ (Measurement Method A3);

The static glass transition temperature is determined by differential scanning calorimetry in accordance with DIN 53765. The figures for the glass transition temperature $T_g$ relate to the glass transformation temperature value $T_g$ according to DIN 53765:1994-03, unless otherwise indicated in a specific case.

Determination of the Gel Fraction (Measurement Method A4);

The carefully dried, solvent-free samples of adhesive are welded into a pouch made of polyethylene nonwoven (Tyvek web). The gel index, this being the toluene-insoluble weight fraction of the polymer, is determined from the difference in the sample weights before and after extraction by ethyl acetate. Additives, such as resins, for example, which even after UV irradiation are not incorporated into the network must be subtracted from the overall sample weight ahead of the extraction.

Measurement Methods (Pressure Sensitive Adhesives):

180° Peel Adhesion Test (Measurement Method H1);

A strip 20 mm wide of the PSA applied as a layer to polyester was applied to steel plates which had been washed beforehand twice with acetone and once with isopropanol. The pressure sensitive adhesive strip was pressed twice onto the substrate using an applied pressure corresponding to a weight of 2 kg. The adhesive tape was subsequently peeled immediately from the substrate at a velocity of 300 mm/min and at an angle of 180°. All measurements were carried out at room temperature.

The measurement results are reported in N/cm and are averaged from three measurements.

Holding Power (Pressure Sensitive Adhesive on PET Film, Measurement Method H2);

A strip of the adhesive tape 13 mm wide and 30 mm long was applied to a smooth steel surface which had been cleaned three times with acetone and once with isopropanol. The bond area was 20 mm*13 mm (length*width), with the adhesive tape overhanging the test plate by 10 mm at the edge. The adhesive tape was then pressed onto the steel support four times with an applied pressure corresponding to a weight of 2 kg. This sample was suspended vertically so that the overhanging end of the adhesive tape pointed downward. At room temperature, a weight of 1 kg was affixed to the overhanging end of the adhesive tape. Measurement was carried out under standard conditions (23° C.+/−1° C., 55%+/−5% humidity) and at 70° C. in a heating cabinet, the sample being loaded with a weight of 0.5 kg for this measurement.

The holding powers measured (times taken for the adhesive tape to detach completely from the substrate; measurement discontinued at 10 000 min) are reported in minutes and correspond to the average from three measurements.

Commercially Available Chemicals Used

| Chemical compound | Tradename | Manufacturer | CAS No. |
|---|---|---|---|
| 2,2'-Azobis(2-methyl-butyronitrile) | Vazo ® 67 | DuPont | 13472-08-7 |
| Bis(4-tert-butylcyclohexyl) peroxydicarbonate | Perkadox ® 16 | Akzo Nobel | 15520-11-3 |
| 2,2'-Azobis(isobutyronitrile) | Vazo ® 64 | DuPont | 78-67-1 |
| Acrylate resin (Tg = 60° C., Mw = 7000 g/mol, acid number = 6) | Dianal MB-2594 | Dianal America, Inc. | — |
| Acrylate resin (MMA copolymer, Tg = 70° C., Mw = 6000 g/mol) | Paraloid ™ DM-55 | Dow | — |
| 2-Hydroxy-1-[4-[4-(2-hydroxy-2-methylpropanoyl)phenoxy]phenyl]-2-methylpropan-1-one | Esacure ® KIP 160 | Lamberti | 71868-15-0 |
| Oligo[2-hydroxy-2-methyl-1-[4-(1-methyl-vinyl)phenyl)propanone | Esacure ® KIP 150 | Lambert | 163702-01-0 |
| 2-Isopropylthioxanthone | Speedcure ™ ITX | Lambson | 5495-84-1 |
| 2,2-Dimethoxy-1,2-diphenylethan-1-one | Irgacure ® 651 | BASF SE | 24650-42-8 |
| Bis(2,4,6-trimethyl-benzoyl)phenylphosphine oxide. | Irgacure ® 819 | BASF SE | 162881-26-7 |
| 4-(4-Methylphenylthio)-benzophenone | Speedcure ™ BMS | Lambson | 83848-85-9 |
| 2-Benzyl-2-dimethylamino-1-(4-morpholino-phenyl)butan-1-one | Irgacure ® 369 | BASF SE | 119313-12-1 |
| Terpene-phenolic resin (softening point 110° C.; $M_w$ = 500-800 g/mol; D= 1.50) | Dertophene ® T110 | DRT resins | 25359-84-6 |
| Urea-aldehyde resin (melting range 80-95° C.) | Laropal ® A 81 | BASF SE | 28211-77-0 |

-continued

| Chemical compound | Tradename | Manufacturer | CAS No. |
|---|---|---|---|
| Resin of hydrogenated abietic ester (softening point 85° C.) | Foral ™ 85-E | Eastman | 8050-31-5 |
| UV-crosslinkable acrylate hotmelt PSA (K value 48-52) | acResin ® A 260 UV | BASF SE | — |

All specification details at 20° C.

I Production and Crosslinking of the Resin-Modified Adhesives—Effect of the Photoinitiator Preparation of the Reference Polymers;

Pressure Sensitive Adhesive PSA1:

A 200 L glass reactor conventional for radical polymerizations was charged with 2.4 kg of acrylic acid (AA, 3%), 39.0 kg of 2-ethylhexyl acrylate (EHA, 48.5%), 39.0 kg of butyl acrylate (BA, 48.5%) and 53.3 kg of acetone/isopropanol (96:4). After nitrogen gas had been passed through the reactor for 45 minutes, with stirring, the reactor was heated to 58° C. and 0.8 kg of Vazo® 67 was added. Thereafter the external heating bath was heated to 75° C. and the reaction was carried out constantly at this external temperature. After a reaction time of 1 hour a further 0.8 kg of Vazo® 67 was added. Over a period of 5 hours, dilution took place at hourly intervals, depending on increase in viscosity, using each time 5.0 to 10.0 kg of acetone/isopropanol (96:4). To reduce the level of the residual monomers, 1.5 kg portions of Perkadox® 16 were after after 6 hours and after 7 hours, with further interim dilution with 15 kg of acetone/isopropanol (96:4). After a reaction time of 24 hours, the reaction was discontinued and the batch was cooled to room temperature.

The resulting polyacrylate had a K value of 75.1, an average molecular weight of $M_w$=1 048 000 g/mol, a polydispersity of D ($M_w/M_n$)=16.9, and a static glass transition temperature of $T_g$=−39.9° C.

Pressure Sensitive Adhesive PSA2:

A 200 L glass reactor conventional for radical polymerizations was charged with 4.8 kg of acrylic acid (AA, 6%), 3.2 kg of N-tert-butylacrylamide (NTBAM, 4%), 9.6 kg of methyl acrylate (MA, 12%), 62.4 kg of 2-ethylhexyl acrylate (EHA, 78%) and 60 kg of acetone/isopropanol (96:4). After nitrogen gas had been passed through the reactor for 45 minutes, with stirring, the reactor was heated to 58° C. and 40 g of 2,2'-azoisobutyronitrile (AIBN) were added. Thereafter the external heating bath was heated to 75° C. and the reaction was carried out constantly at this external temperature. After a reaction time of 1 hour a further 40 g of AIBN were added. After a reaction time of 48 hours, the reaction was discontinued and the batch was cooled to room temperature.

The resulting polyacrylate had a K value of 62.2, an average molecular weight of $M_w$=965 000 g/mol, a polydispersity of D ($M_w/M_n$)=9.9, and a static glass transition temperature of $T_g$=−19.2° C.

UV Irradiation

UV irradiation was carried out using a UV unit from Eltosch. The unit is equipped with a medium-pressure Hg UV source having an intensity of 120 W/cm. The swatch specimens were each run through the unit at a velocity of 20 m/min, with the specimens being irradiated in a plurality of passes in order to increase the irradiation dose.

Inventive Example I/1

70 weight fractions of the pressure sensitive adhesive PSA1 were blended with 30 weight fractions of the acrylate resin Dianal MB-2594 and also with 0.5 wt % of Esacure® KIP 160, based on the polymer, and the blend was then concentrated in a single-screw extruder (from Berstorff). The speed of the screw was 160 rpm and a throughput of 55 kg/h was realized. For concentration, reduced pressure was applied at three different domes. The reduced pressures were 130 mbar, 75 mbar and 60 mbar respectively, with the smallest reduced pressure being applied in the first dome. The exit temperature of the concentrated hotmelt was 130° C. For coating, the strands were melted in a slot die (from Pröjs). After conditioning at 120° C. for 48 hours, coating took place onto an etched PET film 23 μm thick. The coat weight was 50 g/m². The adhesive tape specimen was then irradiated with the UV unit. To determine the crosslinking efficiency, Measurement method A4 was conducted in each case.

Inventive Example I/2

70 weight fractions of the pressure sensitive adhesive PSA1 were blended with 30 weight fractions of the acrylate resin Dianal MB-2594 and with 0.5 wt % of Esacure® KIP 150, based on the polymer. The procedure was subsequently analogous to that of Inventive Example I/1. The adhesive tape specimen was irradiated with the UV unit and the crosslinking efficiency was determined by carrying out Measurement method A4.

Comparative Example I/3

70 weight fractions of the pressure sensitive adhesive PSA1 were blended with 30 weight fractions of the acrylate resin Dianal MB-2594 and with 0.5 wt % of Speedcure™ ITX, based on the polymer. The procedure was subsequently analogous to that of Inventive Example I/1. The adhesive tape specimen was irradiated with the UV unit and the crosslinking efficiency was determined by carrying out Measurement method A4.

Comparative Example I/4

70 weight fractions of the pressure sensitive adhesive PSA1 were blended with 30 weight fractions of the acrylate resin Dianal MB-2594 and with 0.5 wt % of Irgacure® 651, based on the polymer. The procedure was subsequently analogous to that of Inventive Example I/1. The adhesive tape specimen was irradiated with the UV unit and the crosslinking efficiency was determined by carrying out Measurement method A4.

Comparative Example I/5

70 weight fractions of the pressure sensitive adhesive PSA1 were blended with 30 weight fractions of the acrylate resin Dianal MB-2594 and with 0.5 wt % of Irgacure® 819, based on the polymer. The procedure was subsequently analogous to that of Inventive Example I/1. The adhesive tape specimen was irradiated with the UV unit and the crosslinking efficiency was determined by carrying out Measurement method A4.

Comparative Example I/6

70 weight fractions of the pressure sensitive adhesive PSA1 were blended with 30 weight fractions of the acrylate resin Dianal MB-2594 and with 0.5 wt % of Speedcure™ BMS, based on the polymer. The procedure was subsequently analogous to that of Inventive Example I/1. The adhesive tape specimen was irradiated with the UV unit and the crosslinking efficiency was determined by carrying out Measurement method A4.

Inventive Example I/7

75 weight fractions of the pressure sensitive adhesive PSA2 were blended with 25 weight fractions of the acrylate resin Paraloid™ DM-55 and with 0.5 wt % of Esacure® KIP 160, based on the polymer. The procedure was subsequently analogous to that of Inventive Example I/1. The adhesive tape specimen was irradiated with the UV unit and the crosslinking efficiency was determined by carrying out Measurement method A4.

Comparative Example I/8

75 weight fractions of the pressure sensitive adhesive PSA2 were blended with 25 weight fractions of the acrylate resin Paraloid™ DM-55 and with 0.5 wt % of Irgacure® 369, based on the polymer. The procedure was subsequently analogous to that of Inventive Example I/1. The adhesive tape specimen was irradiated with the UV unit and the crosslinking efficiency was determined by carrying out Measurement method A4.

Results:

In order to demonstrate the efficiency of the PSA formulations of the invention, the effect of the polyfunctional α-splitter photoinitiators was tested first of all in comparison to alternative UV photoinitiators, with all of the formulations containing the acrylate resin of the invention. Irgacure® 819, 651, 369 and Speedcure™ BMS are standard systems—both Norrish type I initiators and Norrish type II initiators—for the UV crosslinking of polyacrylates. Speedcure™ ITX is considered an extremely reactive photoinitiator and was therefore likewise tested in comparison. The results are summarized in Table 1.

TABLE 1

Table 1: Effect of the photoinitiators

| Example | UV irradiation (number of passes) | Gel index [%][a] |
|---|---|---|
| I/1 | 0 | 0 |
| I/1 | 1 | 35 |
| I/1 | 2 | 74 |
| I/2 | 0 | 0 |
| I/2 | 1 | 28 |
| I/2 | 2 | 71 |
| I/3 | 1 | 9 |
| I/3 | 2 | 22 |
| I/4 | 1 | 3 |
| I/4 | 2 | 5 |
| I/5 | 1 | 5 |
| I/5 | 2 | 12 |
| I/6 | 1 | 9 |
| I/6 | 2 | 16 |
| I/7 | 1 | 24 |
| I/7 | 2 | 61 |
| I/8 | 1 | 2 |
| I/8 | 2 | 11 |

[a] Measurement method A4

The best results were achieved with the polyfunctional photoinitiators (Examples I/1, I/2 and I/7). Even with very low doses (reported in passes through the UV unit), very high gel indices were achievable, so making these photoinitiators exceptionally well suited to the crosslinking of resin-modified polyacrylate PSAs. In comparison to the other photoinitiators, therefore, the effort and complexity involved in irradiation (number of UV lamps, energy) is considerably lower, so making the operation substantially more advantageous from an economic standpoint.

It is further apparent from Table 1 that certain photoinitiators possess virtually no effect for the crosslinking of resin-modified polyacrylates, and that the difference in terms of the gel indices achievable after crosslinking between the crosslinking procedures initiated with polyfunctional photoinitiators and the other systems is very great. The boost in efficiency is therefore significant.

It is known, moreover, that the low volatility of photoinitiators poses a problem for the hotmelt process. When the polyfunctional photoinitiators are used, this volatility is lowered significantly because of the higher molecular weights; this is a further advantage of the formulations of the invention in relation to hotmelt processability.

Because of the low degree of crosslinking, the comparative examples were not subjected to technical adhesive evaluation.

II Production and Crosslinking of the Adhesives—Effect of the Resin

Inventive Example II/1

The example corresponds to Inventive Example I/1. The technical adhesive properties were investigated using Measurement methods H1 and H2.

Comparative Example II/2

The pressure sensitive adhesive PSA1 was blended with 0.5 wt % of Esacure® KIP 160, based on the polymer. The procedure was subsequently analogous to that of Inventive Example I/1. The adhesive tape specimen was irradiated with the UV unit, the crosslinking efficiency was determined by carrying out Measurement method A4, and the technical adhesive properties were investigated by carrying out Measurement methods H1 and H2.

Comparative Example II/3

70 weight fractions of the pressure sensitive adhesive PSA1 were blended with 30 weight fractions of the acrylate resin Dianal MB-2594 and with 0.5 wt % of Speedcure™ ITX, based on the polymer. The procedure was subsequently analogous to that of Inventive Example I/1. The adhesive tape specimen was irradiated with the UV unit, the crosslinking efficiency was determined by carrying out Measurement method A4, and the technical adhesive properties were investigated by carrying out Measurement methods H1 and H2.

Inventive Example II/4

The example corresponds to Inventive Example I/2. The technical adhesive properties were investigated using Measurement methods H1 and H2.

Comparative Example II/5

The pressure sensitive adhesive PSA1 was blended with 0.5 wt % of Esacure® KIP 150, based on the polymer. The procedure was subsequently analogous to that of Inventive Example I/1. The adhesive tape specimen was irradiated with the UV unit, the crosslinking efficiency was determined by carrying out Measurement method A4, and the technical adhesive properties were investigated by carrying out Measurement methods H1 and H2.

Comparative Example II/6

70 weight fractions of the pressure sensitive adhesive PSA1 were blended with 30 weight fractions of the terpene-phenolic resin Dertophene® T110 and with 0.5 wt % of Esacure® KIP 160, based on the polymer. The procedure was subsequently analogous to that of Inventive Example I/1. The adhesive tape specimen was irradiated with the UV unit, the crosslinking efficiency was determined by carrying out Measurement method A4, and the technical adhesive properties were investigated by carrying out Measurement methods H1 and H2.

Comparative Example II/7

70 weight fractions of the pressure sensitive adhesive PSA1 were blended with 30 weight fractions of the urea-aldehyde resin Laropal® A 81 and with 0.5 wt % of Esacure® KIP 160, based on the polymer. The procedure was subsequently analogous to that of Inventive Example I/1. The adhesive tape specimen was irradiated with the UV unit, the crosslinking efficiency was determined by carrying out Measurement method A4, and the technical adhesive properties were investigated by carrying out Measurement methods H1 and H2.

Comparative Example II/8

70 weight fractions of the pressure sensitive adhesive PSA1 were blended with 30 weight fractions of the hydrogenated abietic ester resin Foral™ 85-E and with 0.5 wt % of Esacure® KIP 160, based on the polymer. The procedure was subsequently analogous to that of Inventive Example I/1. The adhesive tape specimen was irradiated with the UV unit, the crosslinking efficiency was determined by carrying out Measurement method A4, and the technical adhesive properties were investigated by carrying out Measurement methods H1 and H2.

Inventive Example II/9

The example corresponds to Inventive Example I/7. The technical adhesive properties were investigated using Measurement methods H1 and H2.

Comparative Example II/10

The pressure sensitive adhesive PSA2 was blended with 0.5 wt % of Esacure® KIP 160, based on the polymer. The procedure was subsequently analogous to that of Inventive Example I/1. The adhesive tape specimen was irradiated with the UV unit, the crosslinking efficiency was determined by carrying out Measurement method A4, and the technical adhesive properties were investigated by carrying out Measurement methods H1 and H2.

Comparative Example II/11

75 weight fractions of the UV-crosslinkable pressure sensitive adhesive acResin® A 260 UV were blended with 25 weight fractions of the acrylate resin Paraloid™ DM-55. The procedure was subsequently analogous to that of Inventive Example I/1. The adhesive tape specimen was irradiated with the UV unit, the crosslinking efficiency was determined by carrying out Measurement method A4, and the technical adhesive properties were investigated by carrying out Measurement methods H1 and H2.

To demonstrate the effect of resin and to illustrate the general usefulness on acrylate hotmelt PSAs, different resins were used, and also resin-free specimens were produced as a reference. The results of technical adhesive testing and also of crosslinking efficiency are set out in Table 2.

TABLE 2

Table 2: Effect of the resins

| Example | UV irradiation (number of passes) | Gel index [%]$^{a)}$ | PA steel [N/cm]$^{b)}$ | HP RT, 10N [min]$^{c)}$ |
|---|---|---|---|---|
| II/1 | 2 | 74 | 7.8 | >10 000 |
| II/2 | 2 | 75 | 3.0 | 140 |
| II/3 | 2 | 22 | 7.3 | 120 (C) |
| II/4 | 2 | 71 | 7.3 | 5088 |
| II/5 | 2 | 72 | 3.7 | 178 |
| II/6 | 2 | 20 | 7.1 | <10 (C) |
| II/7 | 2 | 65 | 6.1 | 1240 |
| II/8 | 2 | 71 | 5.8 | 890 |
| II/9 | 2 | 61 | 6.2 | >10 000 |
| II/10 | 2 | 65 | 3.2 | >10 000 |
| II/11 | 2 | 62 | 5.6 | 1250 (C) |

$^{a)}$Measurement method A4;
$^{b)}$Measurement method H1, PA = peel adhesion;
$^{c)}$Measurement method H2, HP = holding power, RT = room temperature; in the absence of details concerning the detachment mechanism, the fracture is an adhesive fracture, otherwise C = cohesive fracture.

The results in Table 2 show that only the PSA formulations of the invention (Examples II/1, II/4 and II/9), comprising a polyfunctional α-splitting UV photoinitiator and an acrylate-based tackifying resin, lead to the desired combination of high adhesion and also high cohesion. It is apparent, furthermore, that through the use of the acrylate resins of the invention (Examples II/1 and II/2, II/4 and II/5 and also II/9 and II/10), the crosslinking is unaffected, and yet both the peel adhesion and the cohesion are increased significantly. The use of a standard photoinitiator (Example II/3), on the other hand, leads to undercrosslinking of the adhesive. Resins which absorb in a similar wavelength range to the photoinitiators lead to a drastic reduction in the degree of crosslinking, as made clear using Example II/6. UV-transparent resins (Examples II/7 and II/9) do lead to adequate degrees of crosslinking, but the technical adhesive properties are inadequate in comparison to the acrylate resins. In Example II/11, a commercially available, UV-crosslinkable acrylate PSA is used which is compounded with an acrylate resin of the invention. Evident here is the above-described disadvantageous effect of the polymer-bound benzophenone photoinitiator, likewise in the form of lower peel adhesions and only weak cohesion.

In summary it may be stated that through the inventive pressure sensitive adhesive formulations, a very stable, readily crosslinkable acrylate hotmelt system is available which exhibits an improved profile of properties relative to other UV-crosslinkable acrylate PSAs.

The invention claimed is:

1. A pressure-sensitive adhesive obtained by crosslinking a composition comprising:
   at least one poly(meth)acrylate having a weight-average molar mass $M_w$ of at least 100,000 g/mol;
   at least one polyfunctional α-splitter; and
   at least one adhesion-boosting resin having a weight-average molar mass $M_w$ of at most 30,000 g/mol,
   wherein:
   the at least one adhesion-boosting resin is obtained by polymerizing a monomer composition M1;
   the monomer composition M1 consists of at least one compound according to formula (I):

$$H_2C=C(R^1)(COOR^2) \quad (I)$$

in which $R^1$ is independently a hydrogen atom or a methyl group and $R^2$ is an unfunctionalized $C_1$-$C_{20}$ alkyl group.

2. The pressure-sensitive adhesive as claimed in claim 1, wherein the at least one compound according to formula (I) is present at 50 wt % or greater based on the total weight of the monomer composition M1.

3. The pressure-sensitive adhesive as claimed in claim 1, wherein $R^2$ in the at least one compound is not an amino-functionalized alkyl group.

4. The pressure-sensitive adhesive as claimed in claim 1, wherein the at least one poly(meth)acrylate has a glass transition temperature $T_{g,A}$ of less than or equal to 15° C.

5. The pressure-sensitive adhesive as claimed in claim 1, wherein the at least one adhesion-boosting resin has a ring and ball softening point (ASTM E28-99) of up to 180° C.

6. The pressure-sensitive adhesive as claimed in claim 1, wherein:
   the at least one adhesion-boosting resin has a glass transition temperature;
   the at least one poly(meth)acrylate has a glass transition temperature; and
   the glass transition temperature of the at least one adhesion-boosting resin is higher by at least 10 K than the glass transition temperature of the at least one poly(meth)acrylate.

7. The pressure-sensitive adhesive as claimed in claim 1, wherein the at least one polyfunctional α-splitter is oligo[2-hydroxy-2-methyl-1-[4-(1-methylvinyl)phenyl]propanone] or an α-hydroxyketone of formula (IV):

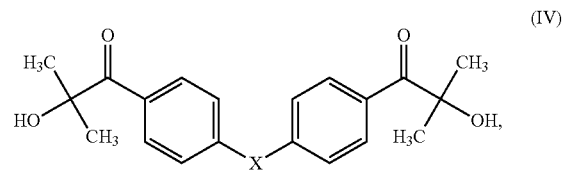

in which X is an oxygen atom or a $CH_2$ group.

8. The pressure-sensitive adhesive as claimed in claim 1, wherein the at least one polyfunctional α-splitter is present at 0.1 to 5 wt % based on the weight of a polymer to be crosslinked.

* * * * *